(12) United States Patent
Yang et al.

(10) Patent No.: US 10,536,517 B2
(45) Date of Patent: *Jan. 14, 2020

(54) DISTRIBUTED GLOBAL SERVER LOAD BALANCING CONTROLLERS SHARING SERVICE DELAY TIME

(71) Applicant: A10 Networks, Inc., San Jose, CA (US)

(72) Inventors: Yang Yang, San Jose, CA (US); Yichao He, San Jose, CA (US); Ali Golshan, Palo Alto, CA (US)

(73) Assignee: A10 Networks, Inc., San Jose, CA (US)

( * ) Notice: Subject to any disclaimer, the term of this patent is extended or adjusted under 35 U.S.C. 154(b) by 362 days.

This patent is subject to a terminal disclaimer.

(21) Appl. No.: 15/460,952

(22) Filed: Mar. 16, 2017

(65) Prior Publication Data

US 2018/0270302 A1    Sep. 20, 2018

(51) Int. Cl.
*H04L 29/08* (2006.01)
*H04L 29/12* (2006.01)

(52) U.S. Cl.
CPC ...... *H04L 67/1004* (2013.01); *H04L 61/1511* (2013.01); *H04L 67/18* (2013.01)

(58) Field of Classification Search
CPC ... H04L 67/1004; H04L 67/18; H04L 61/1511
See application file for complete search history.

(56) References Cited

U.S. PATENT DOCUMENTS

| | | | | |
|---|---|---|---|---|
| 6,871,780 B2 * | 3/2005 | Nygren | ................. | G06Q 20/20 235/375 |
| 6,920,498 B1 * | 7/2005 | Gourlay | ............. | H04L 67/1008 709/200 |
| 7,086,061 B1 * | 8/2006 | Joshi | ................. | H04L 29/12066 718/105 |
| 7,254,626 B1 * | 8/2007 | Kommula | ........... | H04L 67/1008 709/217 |
| 7,584,301 B1 * | 9/2009 | Joshi | ................... | H04L 67/1002 709/244 |
| 8,230,054 B2 * | 7/2012 | Mutnuru | ........... | H04L 29/12066 709/223 |

(Continued)

*Primary Examiner* — Gil H. Lee
*Assistant Examiner* — Javier O Guzman
(74) *Attorney, Agent, or Firm* — Keith Kline; The Kline Law Firm PC (57) ABSTRACT

A method and system for selecting a server load balancer (SLB) for processing requests associated with a client are provided. The method may commence with receiving a Domain Name System (DNS) request from a client DNS server associated with the client. The method may include determining a geolocation of the client. The method may continue with receiving a time delay record including a round trip time (RTT) between the client and each of pluralities of SLBs and a geolocation of each SLB. The method may include matching the geolocation of the client and the geolocation of each of the pluralities of SLBs. The method may include selecting SLBs having the geolocation that matches the geolocation of the client. The method may further include selecting, from the SLBs, an SLB having a lowest RTT and sending a DNS response comprising network data of the selected SLB to the client DNS server.

20 Claims, 7 Drawing Sheets

(56) References Cited

U.S. PATENT DOCUMENTS

| | | | | |
|---|---|---|---|---|
| 8,862,740 B2* | 10/2014 | Joshi | .................. | H04L 67/1002 |
| | | | | 709/226 |
| 9,338,182 B2* | 5/2016 | Devarapalli | ........ | H04L 61/1511 |
| 9,912,612 B2* | 3/2018 | Sabaa | ..................... | H04L 49/15 |
| 10,064,055 B2* | 8/2018 | Raleigh | ................ | H04W 12/06 |
| 10,122,793 B2* | 11/2018 | Liu | .................... | H04L 67/1029 |
| 2004/0019659 A1* | 1/2004 | Sadot | ..................... | H04L 29/06 |
| | | | | 709/219 |
| 2006/0271655 A1* | 11/2006 | Yoon | ................... | H04L 67/1008 |
| | | | | 709/223 |
| 2010/0010991 A1* | 1/2010 | Joshi | .................. | H04L 67/1002 |
| | | | | 707/E17.017 |
| 2010/0036954 A1* | 2/2010 | Sakata | ................ | H04L 12/6418 |
| | | | | 709/226 |
| 2010/0042743 A1* | 2/2010 | Jeon | ................. | H04L 29/12066 |
| | | | | 709/238 |
| 2011/0093522 A1* | 4/2011 | Chen | ................ | H04L 29/12066 |
| | | | | 709/203 |
| 2011/0153831 A1* | 6/2011 | Mutnuru | .......... | H04L 29/12066 |
| | | | | 709/226 |
| 2014/0258536 A1* | 9/2014 | Chiong | ................ | H04L 47/125 |
| | | | | 709/226 |
| 2014/0304412 A1* | 10/2014 | Prakash | ............. | H04L 61/1511 |
| | | | | 709/226 |
| 2015/0106523 A1* | 4/2015 | Cui | .................... | H04L 67/1036 |
| | | | | 709/226 |
| 2015/0281104 A1* | 10/2015 | Golshan | ............... | H04L 47/125 |
| | | | | 370/238 |
| 2015/0334179 A1* | 11/2015 | Eisenbud | ........... | H04L 67/1002 |
| | | | | 709/226 |

* cited by examiner

DISTRIBUTED GLOBAL SERVER LOAD BALANCING CONTROLLERS SHARING SERVICE DELAY TIME

TECHNICAL FIELD

This disclosure relates generally to data processing and more particularly to selecting server load balancers (SLBs) for processing requests associated with clients based on a geolocation associated with the SLBs and the clients.

BACKGROUND

The approaches described in this section could be pursued but are not necessarily approaches that have previously been conceived or pursued. Therefore, unless otherwise indicated, it should not be assumed that any of the approaches described in this section qualify as prior art merely by virtue of their inclusion in this section.

A Global Server Load Balancing (GSLB) system may use a GSLB controller to balance workloads among multiple servers located at different geographical locations. When the GSLB system receives a session request from a local Domain Name System (DNS) server of a client, the GSLB system usually selects a server that has a minimum response time to the session request from the client. However, an SLB associated with the selected server and the client may have different geolocations. In view of different geolocations, sending the requests between the client and the selected server may be associated with difficulties caused by distances between the client and the SLB of the selected server.

Furthermore, in conventional technical solutions, the GSLB controller may select a server that is located at the same geographical location as the client. The GSLB controller usually performs matching of the geographical locations of the server and the client by determining a geographical location of the local DNS server of the client and matching the determined geographical location to a predetermined geographical location of the server. However, the same geographical location may have SLBs associated with other servers that may be in communication with other GSLB controllers. Therefore, the GSLB controller does not consider servers associated with other GSLB controllers, even though the SLBs associated with these servers may have lower response time than that of the servers associated with the GSLB controller.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

The present disclosure is related to approaches for selecting an SLB for processing requests associated with a client. According to one of the approaches of the present disclosure, a system for selecting an SLB for processing requests associated with a client is provided. Specifically, the system for selecting an SLB for processing requests associated with a client may include a first GSLB controller, a second GSLB controller, and a database. The first GSLB controller and the second GSLB controller may be associated with a plurality of distributed GSLB controllers. The first GSLB controller may be configured to receive a DNS request from a client DNS server associated with a client. The DNS request may include a request to establish a session between the client and one of a plurality of application servers. The first GSLB controller may be configured to determine a geolocation associated with the client based on the DNS request. The first GSLB controller may be further configured to receive a time delay record from each of a first plurality of SLBs associated with the first GSLB controller. The time delay record may include a round trip time (RTT) between the client and each of the first plurality of SLBs and a geolocation associated with each of the first plurality of SLBs. Each of the first plurality of SLBs may be associated with one or more of the plurality of application servers. The first GSLB controller may be further configured to receive, from a second GSLB controller, a time delay record associated with each of a second plurality of SLBs associated with the second GSLB controller. The time delay record may include a RTT between the client and each of the second plurality of SLBs and a geolocation associated with each of the second plurality of SLBs. Each of the second plurality of SLBs may be associated with one or more of the plurality of application servers. Based on the time delay record received from each of the first plurality of SLBs and each of the second plurality of SLBs, the first GSLB controller may match the geolocation associated with the client and the geolocation associated with each of the first plurality of SLBs and each of the second plurality of SLBs. Based on the matching, the first GSLB controller may select one or more SLBs having the geolocation that matches the geolocation associated with the client. The first GSLB controller may be further configured to select, from the one or more SLBs, based on the time delay record received from each of the first plurality of SLBs and each of the second plurality of SLBs, an SLB having a lowest RTT. Based on the selection of the SLB having the lowest RTT, the first GSLB controller may send a DNS response to the client DNS server. The DNS response may include network data of the SLB having the lowest RTT. The second GSLB controller may be configured to receive, from the first GSLB controller, an instruction to provide the time delay record associated with each of the second plurality of SLBs associated with the second GSLB controller. In response to the instruction, the second GSLB controller may provide the time delay record associated with each of the second plurality of SLBs to the first GSLB controller. The database may be configured to store the time delay record associated with the each of the first plurality of SLBs and the time delay record associated with the each of the second plurality of SLBs.

According to another approach of the present disclosure, a method for selecting an SLB for processing requests associated with a client is provided. The method may commence with receiving, by a first GSLB controller associated with a plurality of distributed GSLB controllers, a DNS request from a client DNS server associated with a client. The DNS request may include a request to establish a session between the client and one of a plurality of application servers. The method may continue with determining, by the first GSLB controller, a geolocation associated with the client. The geolocation associated with the client may be determined based on the DNS request. The method may continue with receiving, by the first GSLB controller, a time delay record from each of a first plurality of SLBs associated with the first GSLB controller. The time delay record may include a RTT between the client and the each of the first plurality of SLBs and a geolocation associated with the each of the first plurality of SLBs. The each of the first plurality of SLBs may be associated with one or more of the plurality of application servers. The method may further include receiving, by the first GSLB controller, from a second GSLB controller, a time delay record associated with each of a second plurality of SLBs associated with the second GSLB controller. The time delay record may include a RTT between the client and the each of the second plurality of SLBs and a geolocation associated with the each of the second plurality of SLBs. The each of the second plurality of SLBs may be associated with one or more of the plurality of application servers. The method may continue with matching, by the first GSLB controller, the geolocation associated with the client and the geolocation associated with the each of the first plurality of SLBs and the each of the second plurality of SLBs. The matching may be performed based on the time delay record received from the each of the first plurality of SLBs and the each of the second plurality of SLBs. The method may further include selecting, by the first GSLB controller, based on the matching, one or more SLBs having the geolocation that matches the geolocation associated with the client. The first GSLB controller may select, from the one or more SLBs, based on the time delay record received from the each of the first plurality of SLBs and the each of the second plurality of SLBs, an SLB having a lowest RTT. The method may further include sending, by the first GSLB controller, based on the selection of the SLB having the lowest RTT, a DNS response to the client DNS server. The DNS response may include network data of the SLB having the lowest RTT.

In further example embodiments of the present disclosure, the method operations are stored on a machine-readable medium comprising instructions, which, when implemented by one or more processors, perform the recited operations. In yet further example embodiments, hardware systems or devices can be adapted to perform the recited operations. Other features, examples, and embodiments are described below.

BRIEF DESCRIPTION OF THE DRAWINGS

Embodiments are illustrated by way of example, and not by limitation, in the figures of the accompanying drawings, in which like references indicate similar elements.

DETAILED DESCRIPTION

The following detailed description includes references to the accompanying drawings, which form a part of the detailed description. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is therefore not to be taken in a limiting sense, and the scope is defined by the appended claims and their equivalents. In this document, the terms "a" and "an" are used, as is common in patent documents, to include one or more than one. In this document, the term "or" is used to refer to a nonexclusive "or," such that "A or B" includes "A but not B," "B but not A," and "A and B," unless otherwise indicated.

The techniques of the embodiments disclosed herein may be implemented using a variety of technologies. For example, the methods described herein may be implemented in software executing on a computer system or in hardware utilizing either a combination of microprocessors or other specially designed application-specific integrated circuits, programmable logic devices, or various combinations thereof. In particular, the methods described herein may be implemented by a series of computer-executable instructions residing on a storage medium, such as a disk drive or computer-readable medium. It should be noted that methods disclosed herein can be implemented by a computer (e.g., a desktop computer, a tablet computer, a laptop computer), a game console, a handheld gaming device, a cellular phone, a smart phone, a smart television system, and so forth.

As outlined in the summary, the embodiments of the present disclosure are directed to collecting a RTT associated with a plurality of SLBs, sharing the collected RTT between distributed GSLB controllers, and selecting an SLB for processing client requests based on the collected RTT and a geolocation of the SLB and a geolocation of a client. The client may send a session request to establish a communication session with a server, such as an application server. A local DNS server, also referred to as a client DNS server, may receive the session request from the client and send the session request to a GSLB controller in a data network. The data network may have a plurality of distributed GSLB controllers, which can communicate with one another. For example, the distributed GSLB controllers may send requests to one another and maintain a common database.

Upon receipt of the session request, the GSLB controller may instruct a plurality of SLBs associated with the GSLB controller to measure response time for a plurality of servers associated with the SLBs in the data network. More specifically, each of the SLBs may measure a RTT of sending a request between the SLB and the client. Each of the SLBs may further measure a RTT between the SLB and each of the servers. The SLBs may provide all measured RTTs, as well as the response time being a sum of the RTT between the SLB and the client and the RTT between the SLB and the server, to the GSLB controller. The SLBs may further provide data associated with a geolocation of the SLBs to the GSLB controller.

Additionally, the GSLB controller may instruct other GSLB controllers of the plurality of distributed GSLB controllers to obtain response times and geolocations associated with other SLBs associated with other servers in the data network. The GSLB controller may receive requested data from other GSLB controllers and store the data to a time distance table in a database. The GSLB controller may further determine a geolocation of the client (for example, based on an Internet Protocol (IP) address present in the session request of the client). The GSLB controller may match the geolocation of the client to geolocations of the plurality of SLBs. The GSLB controller may further select one or more SLBs the geolocation of which matches the geolocation of the client. Upon selecting the one or more SLBs, the GSLB controller may compare the response times associated with the selected one or more SLBs. An SLB having the lowest response time may be selected. The GSLB controller may use network data of the SLB having the lowest response time to generate a response to the session request. The GSLB controller may send the response to the client. Therefore, the client may communicate with the SLB having the lowest response time and having the same geolocation as the client.

When the time distance table includes entries for all SLBs in the data network, i.e., when response times between clients and servers associated with the SLBs are known, the GSLB controller does not need to instruct the SLBs to measure RTTs and calculate response times. The data associated with the SLBs may be stored to the time distance table by multiple GSLBs. In fact, the GSLB controller may receive a further session request, determine a geolocation of the client, and search for matching geolocations in the time distance table. When the SLBs having the matching geolocations are found in the time distance table, the SLBs associated with one of servers and having the lowest response time may be selected for processing the further session request of the client.

Figure 1:
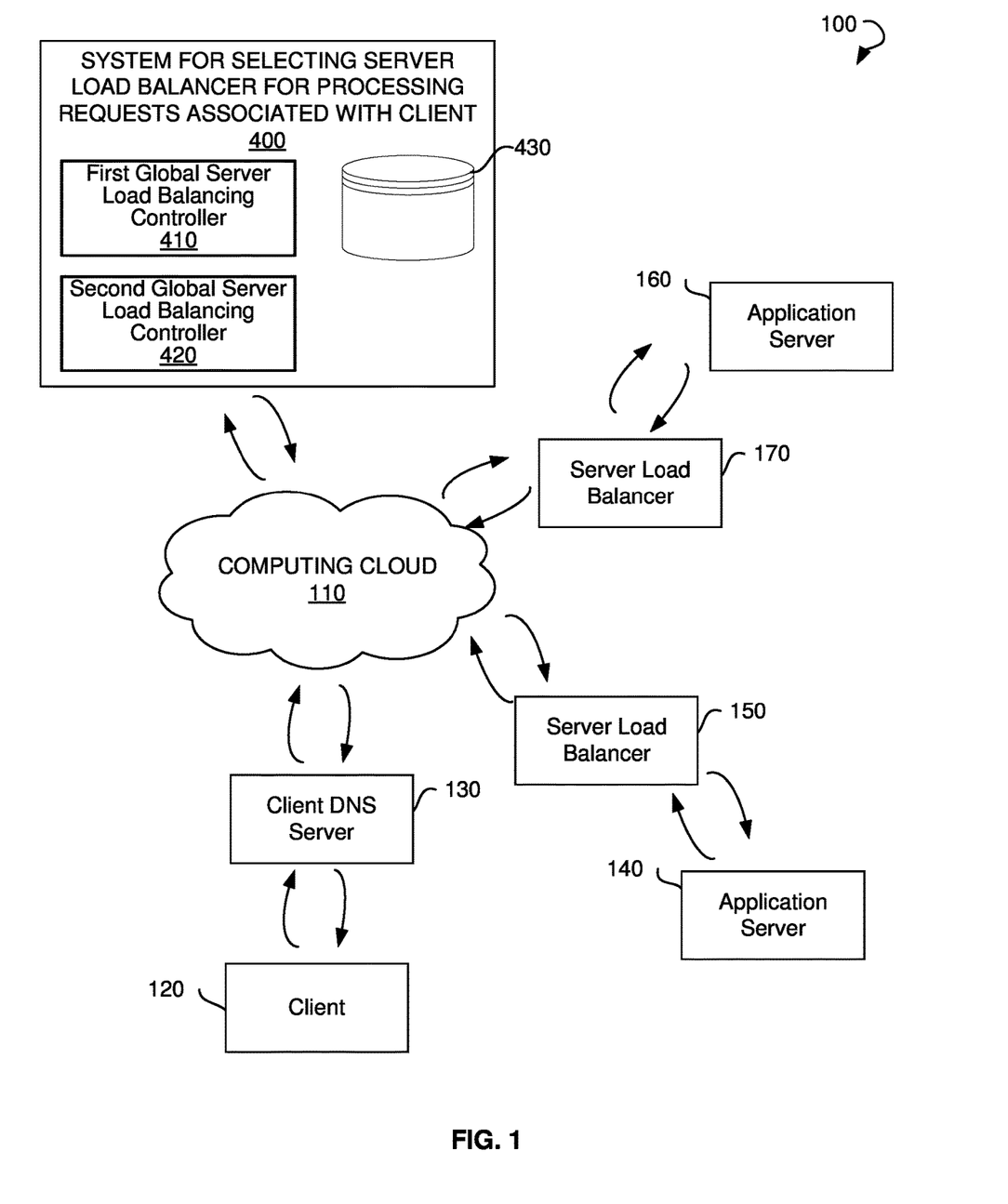
FIG. 1 shows an environment, within which methods and systems for selecting an SLB for processing requests associated with a client can be implemented.

Referring now to the drawings, FIG. 1 illustrates an environment 100 within which methods and systems for selecting an SLB for processing requests associated with a client can be implemented. The environment 100 may include a data network, such as a computing cloud 110, a client 120, a client DNS server 130, an application server 140, an SLB 150 associated with the application server 140, an application server 160, an SLB 170 associated with the application server 160, and a system 400 for selecting an SLB for processing requests associated with a client (also referred to as a system 400). The client 120 may include one or more electronic devices associated with a client premises, such as a personal computer (PC), a laptop, a smartphone, a tablet PC, and so forth. The client 120 may be connected to the computing cloud 110 via the client DNS server 130.

The data network may be not limited to a computing cloud 110 but may include the Internet or any other network capable of communicating data between devices. Suitable networks may include or interface with any one or more of, for instance, a local intranet, a Personal Area Network, a Local Area Network (LAN), a Wide Area Network (WAN), a Metropolitan Area Network, a virtual private network, a storage area network, a frame relay connection, an Advanced Intelligent Network connection, a synchronous optical network connection, a digital T1, T3, E1 or E3 line, Digital Data Service connection, Digital Subscriber Line connection, an Ethernet connection, an Integrated Services Digital Network line, a dial-up port such as a V.90, V.34 or V.34bis analog modem connection, a cable modem, an Asynchronous Transfer Mode connection, or a Fiber Distributed Data Interface or Copper Distributed Data Interface connection. Furthermore, communications may also include links to any of a variety of wireless networks, including Wireless Application Protocol, General Packet Radio Service, Global System for Mobile Communication, Code Division Multiple Access or Time Division Multiple Access, cellular phone networks, Global Positioning System, cellular digital packet data, Research in Motion, Limited duplex paging network, Bluetooth radio, or an IEEE 802.11-based radio frequency network. The data network can further include or interface with any one or more of a Recommended Standard 232 serial connection, an IEEE-1394 (FireWire) connection, a Fiber Channel connection, an IrDA (infrared) port, a Small Computer Systems Interface connection, a Universal Serial Bus (USB) connection or other wired or wireless, digital or analog interface or connection, mesh or Digi® networking. The data network may include a network of data processing nodes, also referred to as network nodes that are interconnected for the purpose of data communication.

The system 400 may include a first GSLB controller 410, a second GSLB controller 420, and a database 430. The first GSLB controller 410 and the second GSLB controller 420 may be collocated with SLBs, such as the SLB 150 and the SLB 170, respectively. Each of the SLB 150 and the SLB 170 may be associated with one or more application servers. More specifically, the SLB 150 may be associated with an application server 140 and the SLB 170 may be associated with an application server 160. In example embodiments, the SLB 150 may be associated with a pool of application servers (not shown) and the application server 140 may be one of the application servers of the pool. Similarly, the SLB 170 may be associated with another pool of application servers (not shown) and the application server 160 may be one of application servers of the another pool.

The first GSLB controller 410 and the second GSLB controller 420 may be distributed GSLB controllers in the computing cloud 110. In fact, the system 400 may have a plurality of distributed GSLB controllers, each of which may be collocated with a plurality of SLBs. In turn, the plurality of SLBs may be associated with a plurality of application servers.

Figure 2:
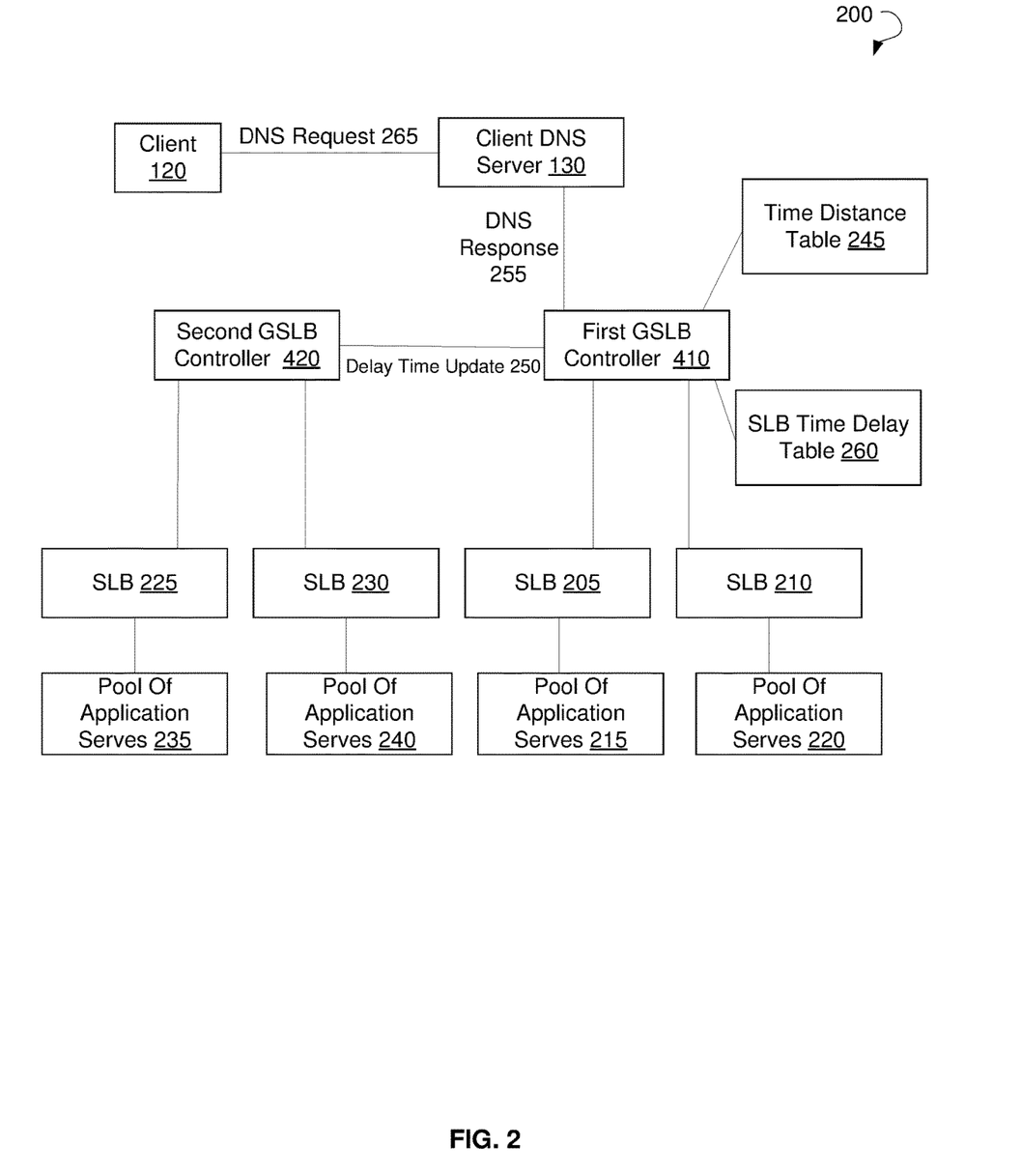
FIG. 2 is a block diagram illustrating selection of an SLB for processing requests associated with a client performed by a distributed GSLB controller.

FIG. 2 is a block diagram 200 illustrating selection of an SLB for processing requests associated with a client performed by a distributed GSLB controller, according to an example embodiment. A first GSLB controller 410 may be in a communication with a plurality of GSLB controllers, such as a second GSLB controller 420. The first GSLB controller 410 may be collocated with a plurality of SLBs shown as an SLB 205 and an SLB 210. Each of the SLBs may be associated with a plurality of application servers. More specifically, the SLB 205 may be associated with a pool 215 of application servers, and the SLB 210 may be associated with a pool 220 of application servers. Similarly, the second GSLB controller 420 may be collocated with a plurality of SLBs shown as an SLB 225 and an SLB 230. The SLB 225 may be associated with a pool 235 of application servers, and the SLB 230 may be associated with a pool 240 of application servers.

The first GSLB controller 410 may receive a DNS request 265 from a client DNS server 130. The DNS request 265 may be sent by a client 120 associated with the client DNS server 130. Based on the DNS request 265, the first GSLB controller 410 may determine a geolocation associated with the client 120. In an example embodiment, the first GSLB controller 410 may determine the geolocation of the client 120 based on an IP address of the client 120 present in the DNS request 265.

Upon receipt of the DNS request 265, the first GSLB controller 410 may instruct each SLB collocated with the first GSLB controller 410, such as the SLB 205 and the SLB 210, to provide a RTT associated with the SLBs and a geolocation associated with the SLBs. In example embodiments, the RTT may be measured in units of time, such as milliseconds, seconds, or time units for data communication. Additionally, the first GSLB controller 410 may instruct the second GSLB controller 420 to collect data associated with the RTT and the geolocation from each SLB collocated with the second GSLB controller 420, such as the SLB 225 and the SLB 230.

In response to the instruction, the SLB 205 may determine the RTT being a time of sending the request from the SLB 205 to the client 120 and back from the client 120 to the SLB 205. More specifically, the instruction may include network data associated with the client 120, such as the IP address. Therefore, the SLB 205 may send a request to the client 120 based on the IP address, receive a response to the request from the client 120, and determine the RTT between the SLB 205 and the client 120. In an example embodiment, the RTT may also include a response time of a server. The response time of the server may include a time of sending a request between the SLB 205 and one of servers of the pool 215. More specifically, the SLB 205 may measure the response time for each server of the pool 215 and add the measured response time to the RTT. Therefore, the SLB 205 may calculate the RTT associated with each server of the pool 215.

Upon measuring the RTT, the SLB 205 may generate one or more time delay records. More specifically, a time delay record may include the RTT between the SLB 205 and the client 120 and a geolocation associated with the SLB 205. In an example embodiment, the RTT present in the time delay record may also include the response time of the servers of the pool 215. Therefore, SLB 205 may generate the time delay record associated with each server of the pool 215.

Similarly, the SLB 210 may also determine the RTT between the SLB 210 and the client 120. In an example embodiment, the RTT measured by the SLB 210 may also include a response time associated with servers of the pool 220. Upon measuring the RTT, the SLB 210 may generate a time delay record including the RTT between the SLB 210 and the client 120 and a geolocation associated with the SLB 210.

Both the SLB 205 and the SLB 210 may send the generated time delay records to the first GSLB controller 410. The second GSLB controller 420 also may send time delay records collected from the SLB 225 and the SLB 230 to the first GSLB controller 410.

Additionally, all SLBs may monitor the RTT and, if there is an update in the RTT, the SLB 205 and the SLB 210 may send a time delay update to the first GSLB controller 410 and the SLB 225 and the SLB 230 may send a time delay update to the second GSLB controller 420. The second GSLB controller 420 may send the received time delay update 250 to the first GSLB controller 410. The first GSLB controller 410 may receive all time delay records and all time delay updates and store them to a time distance table 245. In an example embodiment, the first GSLB controller 410 may also store the RTTs associated with each of the SLBs into an SLB time delay table 260.

The first GSLB controller 410 may match the geolocation of the client 120 with the geolocations of the SLBs present in the time distance table 245. When the match is found, the first GSLB controller 410 may select the SLBs the geolocation of which matches the geolocation of the client 120. When one or more SLBs are selected, the first GSLB controller 410 may match the RTTs associated with the one or more selected SLBs to select the SLB having a lowest RTT. After the SLB having the lowest RTT and having the same geolocation as the client 120 is selected, the first GSLB controller 410 may generate a response shown as a DNS response 255. More specifically, the first GSLB controller 410 may put network data associated with the selected SLB into the DNS response 255 and send the DNS response 255 to the client DNS server 130. The client DNS server 130 may provide the DNS response 255 to the client 120. Upon receiving the network data associated with the selected SLB in the DNS response 255, the client 120 may communicate directly with the selected SLB. Therefore, the client 120 may communicate with the SLB being located at the same geolocation as the client 120 and having the lowest RTT among all SLBs at this geolocation.

In an example embodiment, the DNS response 255 may include one or more response records, such as an IP network address for the requested domain name. The response IP network address may include an IP network address or a virtual IP network address of the selected SLB having the lowest RTT. The DNS response 255 may be sent in response to the DNS request 265 and may include one or more response records for a domain name present in the DNS request 265.

The client DNS server 130 may receive the DNS response 255 from the first GSLB controller 410 and may forward the DNS response 255 to the client 120. The client DNS server 130 may store the response records present in the DNS response 255 into a table of domain name entries (not shown).

The first GSLB controller 410 may communicate with the SLB 205 and the SLB 210 over one or more data sessions using one or more of a Hypertext Transfer Protocol (HTTP), a JavaScript Object Notation (JSON) Representational State Transfer (REST)ful Application Programming Interface (API) over an HTTP protocol, a network management protocol including a Simple Network Management Protocol, secure network protocols including a Secure Shell protocol, a Secure Sockets Layer protocol, and an IP-based session protocol. In further example embodiments, the first GSLB controller 410 may communicate with the SLB 205 and the SLB 210 from time to time to receive the time delay records. The first GSLB controller 410 may communicate with the SLB 205 and the SLB 210 over, for example, a health-check protocol, and obtain health status information about the SLB 205 and the SLB 210 and the time delay records. The first GSLB controller 410 may regularly and from time to time send a health-check request to the SLB 205 and the SLB 210 to receive health status information of the SLB 205 and the SLB 210.

Figure 3:
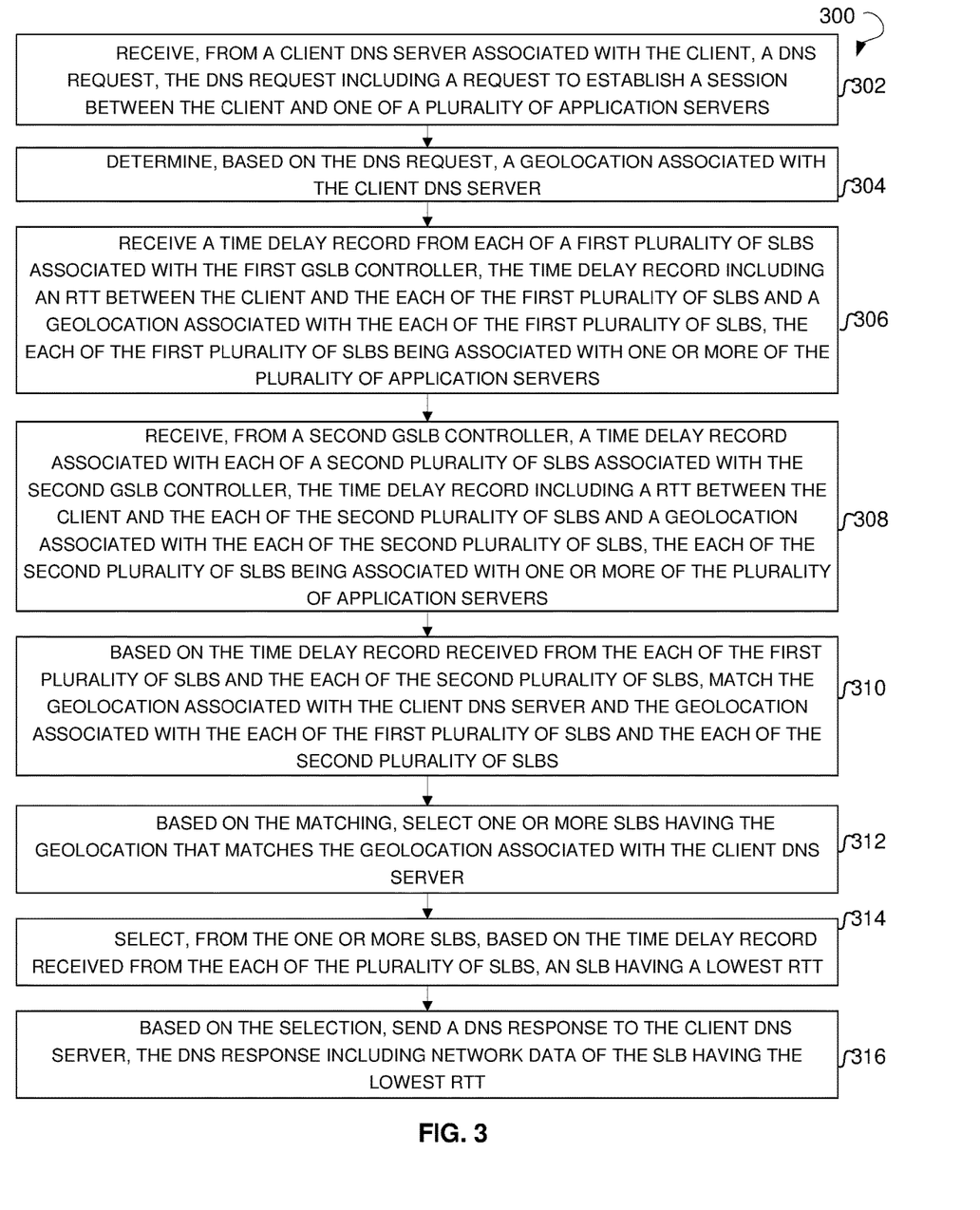
FIG. 3 is a flow diagram illustrating a method for selecting an SLB for processing requests associated with a client.

FIG. 3 shows a process flow diagram of a method 300 for selecting an SLB for processing requests associated with a client, according to an example embodiment. In some embodiments, operations of the method 300 may be combined, performed in parallel, or performed in a different order. The method 300 may also include additional or fewer operations than those illustrated. The method 300 may be performed by processing logic that may comprise hardware (e.g., decision making logic, dedicated logic, programmable logic, and microcode), software (such as software run on a general-purpose computer system or a dedicated machine), or a combination of both.

The method 300 may commence with receiving a DNS request from a client DNS server associated with the client at operation 302. The DNS request may be received by a first GSLB controller associated with a plurality of distributed GSLB controllers. More specifically, the client DNS server may receive the DNS request from the client and forward the DNS request to the first GSLB controller. In an example embodiment, the DNS request may include a request to establish a session between the client and one of a plurality of application servers.

In response to the receipt of the DNS request, the first GSLB controller may determine a geolocation associated with the client at operation 304. The geolocation associated with the client may be determined based on data present in the DNS request. The determining of the geolocation associated with the client may be based on an IP address associated with the client. The IP address may be present in the DNS request.

At operation 306, the first GSLB controller may receive a time delay record from each of a first plurality of SLBs associated with the first GSLB controller. The time delay record may include a RTT between the client and the each of the first plurality of SLBs and a geolocation associated with the each of the first plurality of SLBs. Each of the first plurality of SLBs may be associated with one or more of the plurality of application servers. In an example embodiment, the RTT between the client and the each of the first plurality of SLBs includes a sum of a first RTT between the client and the each of the first plurality of SLBs and a second RTT between the each of the first plurality of SLBs and at least one application server of the plurality of application servers.

The first GSLB controller may be in communication with a second GSLB controller. Both the first GSLB controller and the second GSLB controller may be configured to exchange requests. The method 300 may continue with operation 308, at which the first GSLB controller may receive, from the second GSLB controller, a time delay record associated with each of a second plurality of SLBs associated with the second GSLB controller. The time delay record may include a RTT between the client and the each of the second plurality of SLBs and a geolocation associated with the each of the second plurality of SLBs. Each of the second plurality of SLBs may be associated with one or more of the plurality of application servers. In an example embodiment, the RTT between the client and the each of the second plurality of SLBs may include a sum of a first RTT between the client and the each of the second plurality of SLBs and a second RTT between the each of the second plurality of SLBs and at least one further application server of the plurality of application servers.

Based on the time delay records received from the each of the first plurality of SLBs and the each of the second plurality of SLBs, the first GSLB controller may match the geolocation associated with the client and the geolocation associated with the each of the first plurality of SLBs and the each of the second plurality of SLBs at operation 310. Based on the matching, the first GSLB controller may select one or more SLBs that have the geolocation that matches the geolocation associated with the client at operation 312.

At operation 314, the first GSLB controller may select, from the one or more SLBs, an SLB having a lowest RTT. The selection of the SLB having the lowest RTT may be based on the time delay record received from the each of the first plurality of SLBs and each of the second plurality of SLBs.

Based on the selection of the SLB having the lowest RTT, the first GSLB controller may send a DNS response to the client DNS server at operation 316. The DNS response may include network data of the SLB having the lowest RTT.

The method 300 may further include maintaining, by the first GSLB controller, the second GSLB controller, and each of the plurality of GSLB controllers, a time distance table in a database for storing the time delay record. The first GSLB controller may store the time delay records received from each of the first plurality of SLBs associated with the first GSLB controller and the time delay records received from each of the second plurality of SLBs associated with the second GSLB controller to the time distance table.

The method 300 may further include periodically receiving, by the first GSLB controller, an updated time delay record associated with the each of the first plurality of SLBs and the each of the second plurality of SLBs. The first GSLB controller may store the updated time delay record to the time distance table.

In an example embodiment, upon receipt of the DNS request, the first GSLB controller may search, in the database, for the geolocation associated with one or more of the first plurality of SLBs and the second plurality of SLBs that matches the geolocation associated with the client.

In further example embodiments, the method 300 may include determining, by the first GSLB controller, a type of the session requested to be established by the client. The type of the session may be determined based on a domain name included in the DNS request. In an example embodiment, the domain name may include a string selected from a group comprising: an HTTP, a File Transfer Protocol, a Session Initiation Protocol, a voice over IP, a web, a file, a mail, a Post Office Protocol, an exchange, and an email. The method 300 may also include receiving, by the first GSLB controller, from each of the first plurality of SLBs and the second plurality of SLBs, a processing time associated with each of the at least one application server and the at least one further application server. The processing time may include time needed for each of the at least one application server and the at least one further application server for processing the session based on the type of the session. The first GSLB controller may further sum the processing time and the RTT for each of the first plurality of SLBs and the second plurality of SLBs to obtain a cumulative RTT for each of the first plurality of SLBs and the second plurality of SLBs.

Figure 4:
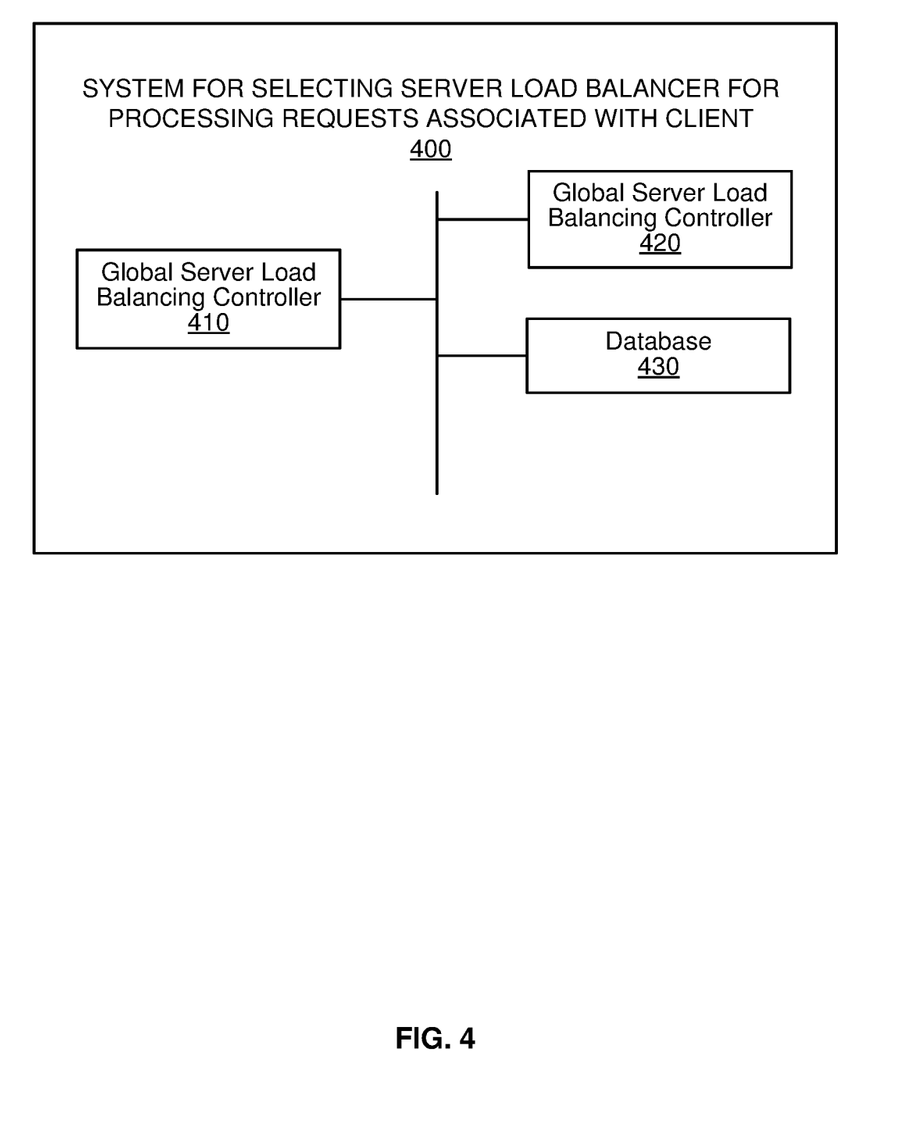
FIG. 4 is a block diagram illustrating various modules of a system for selecting an SLB for processing requests associated with a client.

FIG. 4 shows a block diagram illustrating various modules of a system 400 for selecting an SLB for processing requests associated with a client, according to an example embodiment. Specifically, the system 400 may include a first GSLB controller 410, a second GSLB controller 420, and a database 430. The first GSLB controller 410 and the second GSLB controller 420 may be associated with a plurality of distributed GSLB controllers in the system 400. Furthermore, the first GSLB controller 410 and the second GSLB controller 420 may be configured to exchange requests.

The first GSLB controller 410 may be configured to receive a DNS request from a client DNS server associated with a client. In an example embodiment, the DNS request may include a request to establish a session between the client and one of a plurality of application servers.

The first GSLB controller 410 may be configured to determine a geolocation associated with the client based on the DNS request. The determining of the geolocation associated with the client may be based on an IP address associated with the client. The IP address may be present in the DNS request.

The first GSLB controller 410 may be further configured to receive a time delay record from each of a first plurality of SLBs associated with the first GSLB controller. The time delay record may include a RTT between the client and each of the first plurality of SLBs and a geolocation associated with the each of the first plurality of SLBs. Each of the first plurality of SLBs may be associated with one or more of the plurality of application servers. In some example embodiments, the RTT between the client and the each of the first plurality of SLBs may include a sum of a first RTT between the client and the each of the first plurality of SLBs and a second RTT between the each of the first plurality of SLBs and at least one application server of the plurality of application servers.

Moreover, the first GSLB controller 410 may be configured to receive, from a second GSLB controller, a time delay record associated with each of a second plurality of SLBs associated with the second GSLB controller. The time delay record may include a RTT between the client and each of the second plurality of SLBs and a geolocation associated with the each of the second plurality of SLBs, with each of the second plurality of SLBs being associated with one or more of the plurality of application servers. In some example embodiments, the RTT between the client and the each of the second plurality of SLBs may include a sum of a first RTT between the client and the each of the second plurality of SLBs and a second RTT between the each of the second plurality of SLBs and at least one further application server of the plurality of application servers.

Based on the time delay record received from the each of the first plurality of SLBs and the each of the second plurality of SLBs, the first GSLB controller 410 may match the geolocation associated with the client and the geolocation associated with the each of the first plurality of SLBs and the each of the second plurality of SLBs. Based on the matching, the first GSLB controller 410 may select one or more SLBs having the geolocation that matches the geolocation associated with the client.

The first GSLB controller 410 may further select, from the one or more SLBs, an SLB having a lowest RTT. The selection of the SLB having the lowest RTT may be based on the time delay record received from each of the first plurality of SLBs and each of the second plurality of SLBs.

Based on the selection of the SLB having the lowest RTT, the first GSLB controller 410 may send a DNS response to the client DNS server. The DNS response may include network data of the SLB having the lowest RTT.

The second GSLB controller 420 associated with the plurality of distributed GSLB controllers may be configured to receive, from the first GSLB controller 410, an instruction to provide the time delay record associated with each of the second plurality of SLBs associated with the second GSLB controller. In response to the instruction, the second GSLB controller 420 may provide the time delay record associated with each of the second plurality of SLBs to the first GSLB controller 410.

The database 430 may be configured to store the time delay records associated with the each of the first plurality of SLBs and the time delay records associated with the each of the second plurality of SLBs.

The first GSLB controller 410, the second GSLB controller 420, and each of the plurality of GSLB controllers may be further configured to maintain a time distance table in the database 430 for storing the time delay record. In an example embodiment, the first GSLB controller 410 is further configured to store the time delay record received from the each of the first plurality of SLBs associated with the first GSLB controller to the time distance table, as well as to store the time delay record from the each of the second plurality of SLBs associated with the second GSLB controller to the time distance table.

In an example embodiment, the first GSLB controller 410 may be further configured to periodically receive an updated time delay record associated with the each of the first plurality of SLBs and the each of the second plurality of SLBs. The first GSLB controller 410 may store the updated time delay record to the time distance table.

In some example embodiments, upon receipt of the DNS request, the first GSLB controller 410 may search, in the database 430, for the geolocation associated with one or more of the first plurality of SLBs and the second plurality of SLBs that matches the geolocation associated with the client.

In an example embodiment, the first GSLB controller 410 may be further configured to determine, based on a domain name included in the DNS request, a type of the session requested to be established by the client. The domain name may include a string selected from a group comprising: an HTTP, a File Transfer Protocol, a Session Initiation Protocol, a voice over IP, a web, a file, a mail, a Post Office Protocol, an exchange, an email, and so forth.

The first GSLB controller 410 may further receive, from each of the first plurality of SLBs and the second plurality of SLBs, a processing time associated with each of the at least one application server and the at least one further application server. The processing time may include time needed for each of the at least one application server and the at least one further application server for processing the session based on the type of the session. The first GSLB controller 410 may sum the processing time and the RTT for each of the first plurality of SLBs and the second plurality of SLBs to obtain a cumulative RTT for each of the first plurality of SLBs and the second plurality of SLBs. In this embodiment, the selection of the SLB having the lowest RTT may include selection of the SLB having a lowest cumulative RTT.

Figure 5:
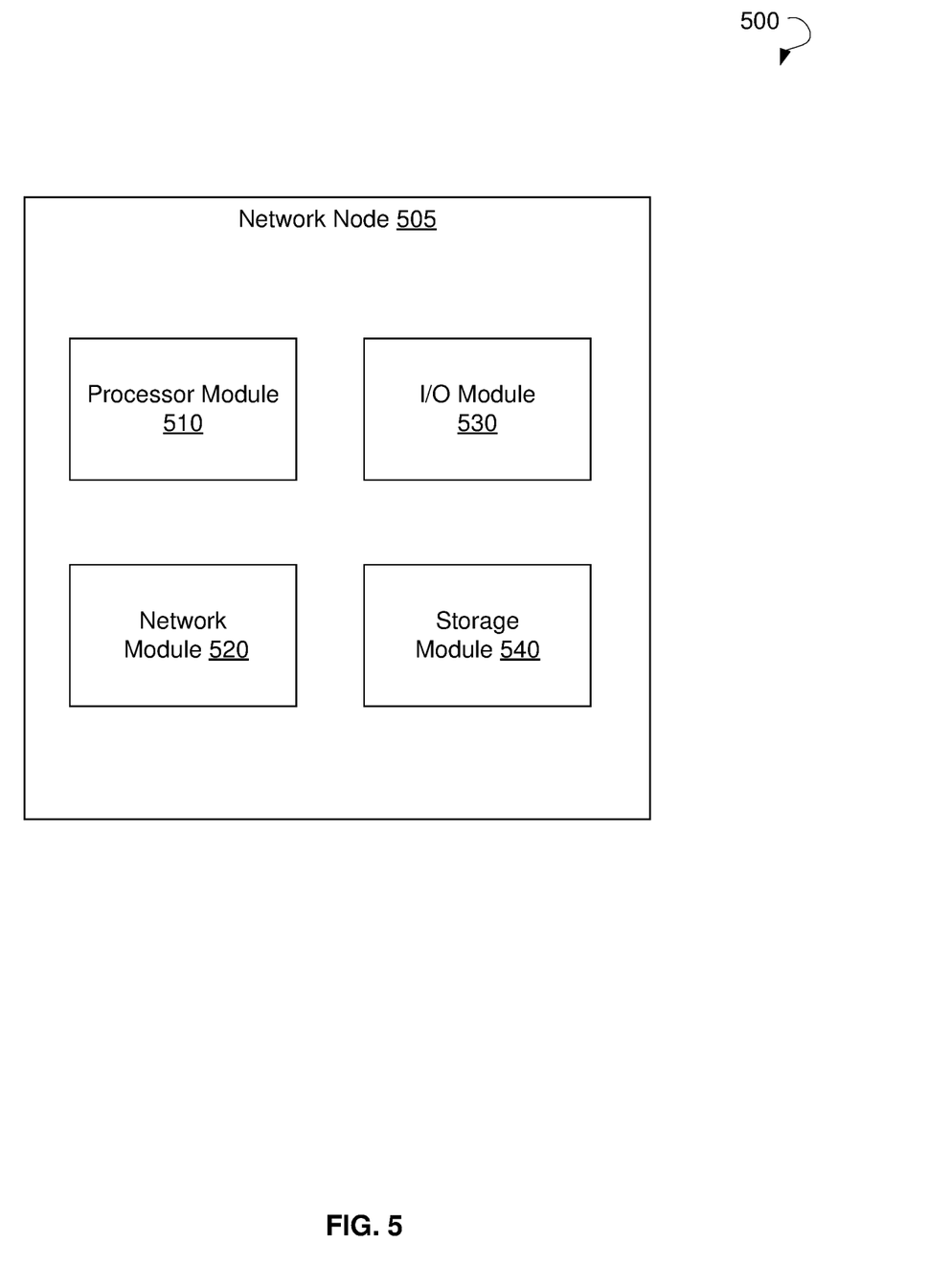
FIG. 5 is a block diagram illustrating a network node.

FIG. 5 is a block diagram 500 illustrating a network node, according to an example embodiment. A network node 505 may be configured in a form of a GSLB controller, an SLB, a client DNS server, a client, and a server. In an example embodiment, the network node 505 includes a processor module 510, a network module 520, an input/output (I/O) module 530, and a storage module 540. The processor module 510 may include one or more processors, such as a microprocessor, an Intel processor, an Advanced Micro Devices processor, a microprocessor without interlocked pipeline stages, an advanced restricted instruction set computer (RISC) machine-based processor, or a RISC processor. In an example embodiment, the processor module 510 may include one or more processor cores embedded in the processor module 510. In a further example embodiment, the processor module 510 may include one or more embedded processors, or embedded processing elements in a Field Programmable Gate Array, an Application Specific Integrated Circuit, or a Digital Signal Processor. In an example embodiment, the network module 520 may include a network interface such as Ethernet, an optical network interface, a wireless network interface, T1/T3 interface, a WAN interface, or a LAN interface. In a further example embodiment, the network module 520 may include a network processor. The storage module 540 may include Random-access memory (RAM), Dynamic Random Access Memory, Static Random Access Memory, Double Data Rate Synchronous Dynamic Random Access Memory, or memory utilized by the processor module 510 or the network module 520. The storage module 540 may store data utilized by the processor module 510. In an example embodiment, the storage module 540 may include a hard disk drive, a solid state drive, an external disk, a Digital Versatile Disc (DVD), a compact disk (CD), or a readable external disk. The storage module 540 may store one or more computer programming instructions which when executed by the processor module 510 or the network module 520 may implement one or more of the functionality of the methods and systems for measuring application response delay described herein. In an example embodiment, the I/O module 530 may include a keyboard, a keypad, a mouse, a gesture-based input sensor, a microphone, a physical or sensory input peripheral, a display, a speaker, or a physical or sensual output peripheral.

Returning to FIG. 2, the first GSLB controller 410 and/or the second GSLB controller 420 may be the network node 505 illustrated in FIG. 5. In an example embodiment, the first GSLB controller 410 and/or the second GSLB controller 420 may include functionality of a DNS server, such as a client DNS server, so as to be able to receive and process the DNS request 265 and send the DNS response 255. In an example embodiment, the SLB 205, the SLB 210, the SLB 225, and the SLB 230 may be the network node 505 illustrated in FIG. 5. In some example embodiments, the first GSLB controller 410 may include functionality of the SLB 205 and the SLB 210.

In a further example embodiment, the client 120 may be the network node 505 illustrated in FIG. 5. The client 120 may include a PC, a laptop computer, a tablet computer, a smartphone, a mobile phone, an Internet phone, a netbook, a home gateway, a broadband gateway, a network appliance, a set top box, a media server, a personal media player, a personal digital assistant, an access gateway, a networking switch, a server computer, a network storage computer, or any computing device having at least a network module and a processor module.

In an example embodiment, any of servers of pools 215, 220, 235, 240 of application servers may include the network node 505 illustrated in FIG. 5.

In further example embodiments, a session requested to be established by the client 120 in the DNS request 265 may include a data communication session to support an application communication session, such as an HTTP session, a file transfer session, a remote access session, a File Transfer Protocol (FTP) session, a voice over IP session, a Session Initiation Protocol session, a video or audio streaming session, an e-commerce session, an enterprise application session, an email session, an online gaming session, a teleconference session, a Web-based communication session, and so forth.

In some example embodiments, the DNS request 265 sent by the client 120 may include a domain name, such as www.abc.com, mail.yahoo.com, ftp.a10networks.com, benefits.hr.company.com, or a Universal Resource Identifier identifying a network or Internet resources, such as computers, computing devices, networks, and services.

In further example embodiments, the client DNS server 130 may be the network node 505 illustrated on FIG. 5. The client DNS server 130 may receive the DNS request 265 and determine a domain name requested according to the DNS request 265. In further embodiments, the client DNS server 130 may include a storage for a table of domain name entries, where each entry may include a domain name and a resource record. The client DNS server 130 may match the requested domain name with the table of domain name entries. If the client DNS server 130 does not find a match of the requested domain name, the client DNS server 130 may forward the DNS request 265 to another client DNS server. In some embodiments, the first GSLB controller 410 may act as another client DNS server. Therefore, the client DNS server 130 may forward the DNS request 265 to the first GSLB controller 410.

Figure 6:
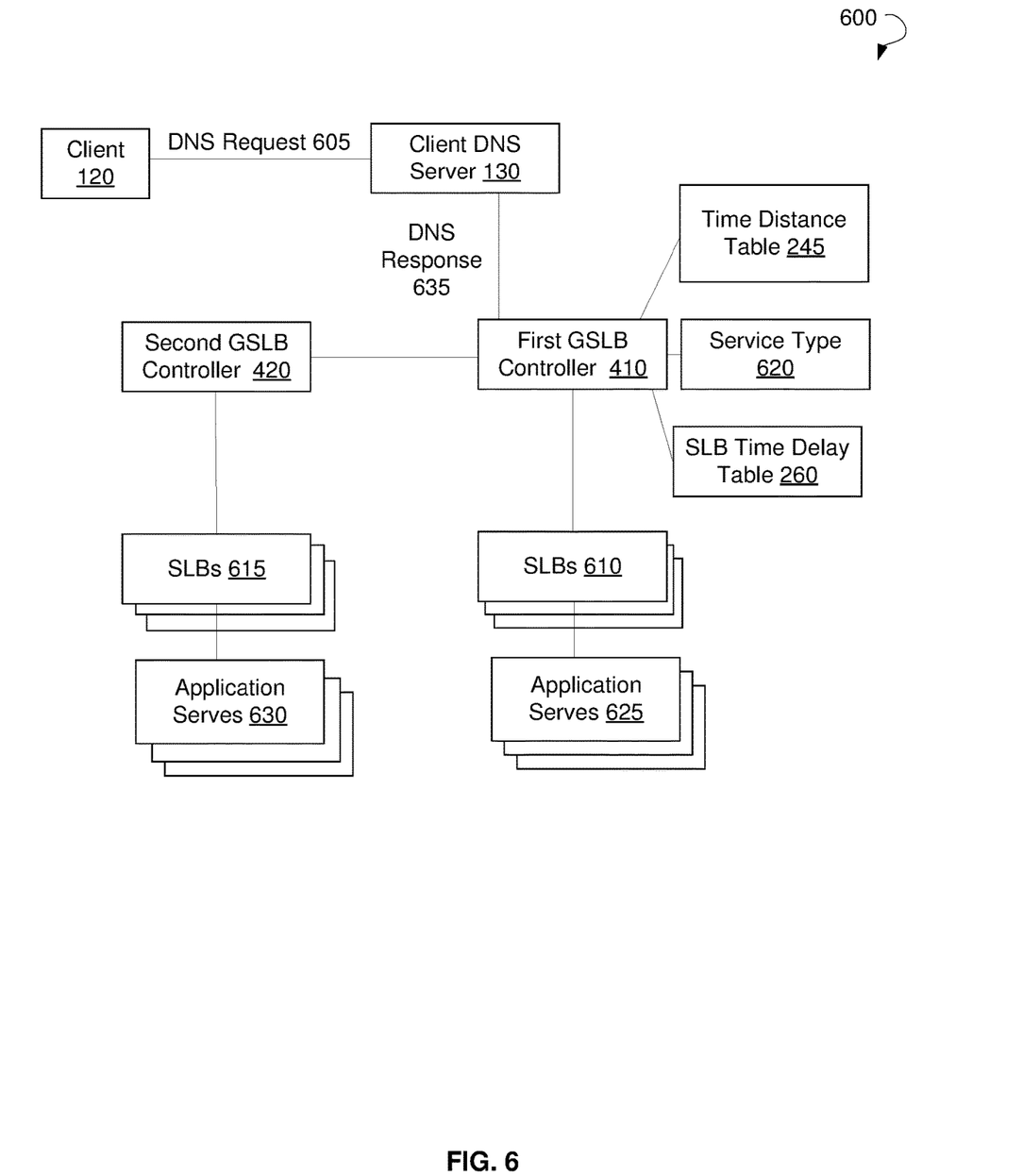
FIG. 6 is a block diagram illustrating selecting an SLB for processing requests associated with a client based on time delay records in a database.

FIG. 6 is a block diagram 600 illustrating selecting an SLB for processing requests associated with a client, according to an example embodiment. The first GSLB controller 410 may receive a DNS request 605 from a client DNS server 130. The first GSLB controller 410 may retrieve information regarding a client 120 from the DNS request 605, such as a geolocation of the client 120. The first GSLB controller 410 may perform a search in a time distance table 245 to find one or more geolocations of a plurality of SLBs 610 associated with the first GSLB controller 410 and a plurality of SLBs 615 associated with the second GSLB controller 420 that match the geolocation associated with the client 120. More specifically, the first GSLB controller 410 may perform the search in time delay records stored in the time distance table 245.

The geolocations of the SLBs 610 and SLBs 615 may be provided by each of the SLBs 610 and the SLBs 615 to the first GSLB controller 410 in previous communications in a form of time delay records. The first GSLB controller 410 may store the time delay records in the time distance table 245. The time delay records may be provided by each of the SLBs in a following format: '<Geolocation-ID>, <Service Delay Time>', where 'Geolocation-ID' may be the geolocation of the SLB and identification (ID) data of the SLB and 'Service Delay Time' may be the RTT between the SLB and a client. The first GSLB controller 410 may receive the time delay records and may store the time delay records to the time distance table 245 in a following format: '((<GSLB-ID>, <SLB-ID>, <Geolocation-ID, Service Time Delay>), . . . )', where 'GSLB-ID' may be identification data of the first GSLB controller 410, 'SLB-ID' may be identification data of the SLB, 'Geolocation-ID, Service Time Delay' may include the geolocation of the SLB and the RTT between the SLB and the client.

When the match is found, the first GSLB controller 410 may select one or more SLBs having the geolocation that matches the geolocation associated with the client 120. The first GSLB controller 410 may further compare the RTTs associated with each of the selected SLBs to find the SLB having the lowest RTT. More specifically, the first GSLB controller 410 may perform the search in the time delay records of the time distance table 245 to compare the RTTs stored in the time delay records.

In an example embodiment, the RTT stored in the time delay records may be a sum of a RTT between an SLB and a client and a further RTT being a service response time of an application server. The service response time may include time needed for an application server associated with the SLB to process the type of a session requested by the client 120.

More specifically, the first GSLB controller 410 may determine, based on the DNS request 605, a service type 620 requested by the client 120. In an example embodiment, the service type 620 is a service name or a protocol name, such as "HTTP," "FTP," "email," or "voice." The first GSLB controller 410 may retrieve a domain name from the DNS request 605 and determine the service type 620 based on the retrieved domain name. In an example embodiment, the retrieved domain name includes a string, such as "http," "www," or "web." The first GSLB controller 410 may determine that the service type 620 is "HTTP." In further embodiments, the retrieved domain name may include a string "ftp" or "file." Therefore, the first GSLB controller 410 may determine that the service type 620 is "FTP." In a further example embodiment, the retrieved domain name includes a string "SMTP" (related to a Simple Mail Transfer Protocol), "POP" (related to a Post Office Protocol), "mail," or "exchange." The first GSLB controller 410 may determine the service type 620 to be "email." In a further embodiment, the retrieved domain name includes a string "SIP" or "VoIP." The first GSLB controller 410 may determine that the service type 620 is "voice."

The first GSLB controller 410 may be unable to determine the service type 620 based on the DNS request 605. In this case, the first GSLB controller 410 may consider the service type first to be "HTTP" for the DNS request 605.

The first GSLB controller 410 may connect to each of the SLBs 610 and receive a service response time (not shown) for the service type 620 from each of the SLBs 610. More specifically, the first GSLB controller 410 may send a request including the service type 620 to the SLBs 610 requesting the SLB 610 to respond with the service response time for the service type 620 (i.e., time needed for each of application servers 625 associated with the SLBs 610 to process the type of a session requested according to the service type 620). The SLBs 610 may measure the service response time and send the service response time to the first GSLB controller 410. The service response time may be sent together with the service type 620 for which the service response time was determined. In some example embodiments, the SLBs 610 may send the service response time to the first GSLB controller 410 without receiving the request from the first GSLB controller 410. Additionally, the second GSLB controller 420 may send the service response time of application servers 630 associated with the SLBs 615 to the first GSLB controller 410. In an example embodiment, the service response time may be measured during previous sessions between the client 120 and one of the application servers and may be stored in the time distance table 245.

When the SLB having the lowest RTT is selected by the first GSLB controller 410, the first GSLB controller 410 may generate a DNS response 635 and may send the DNS response 635 to the client DNS server 130. More specifically, the DNS response 635 may include network data associated with the selected SLB having the lowest RTT.

Figure 7:
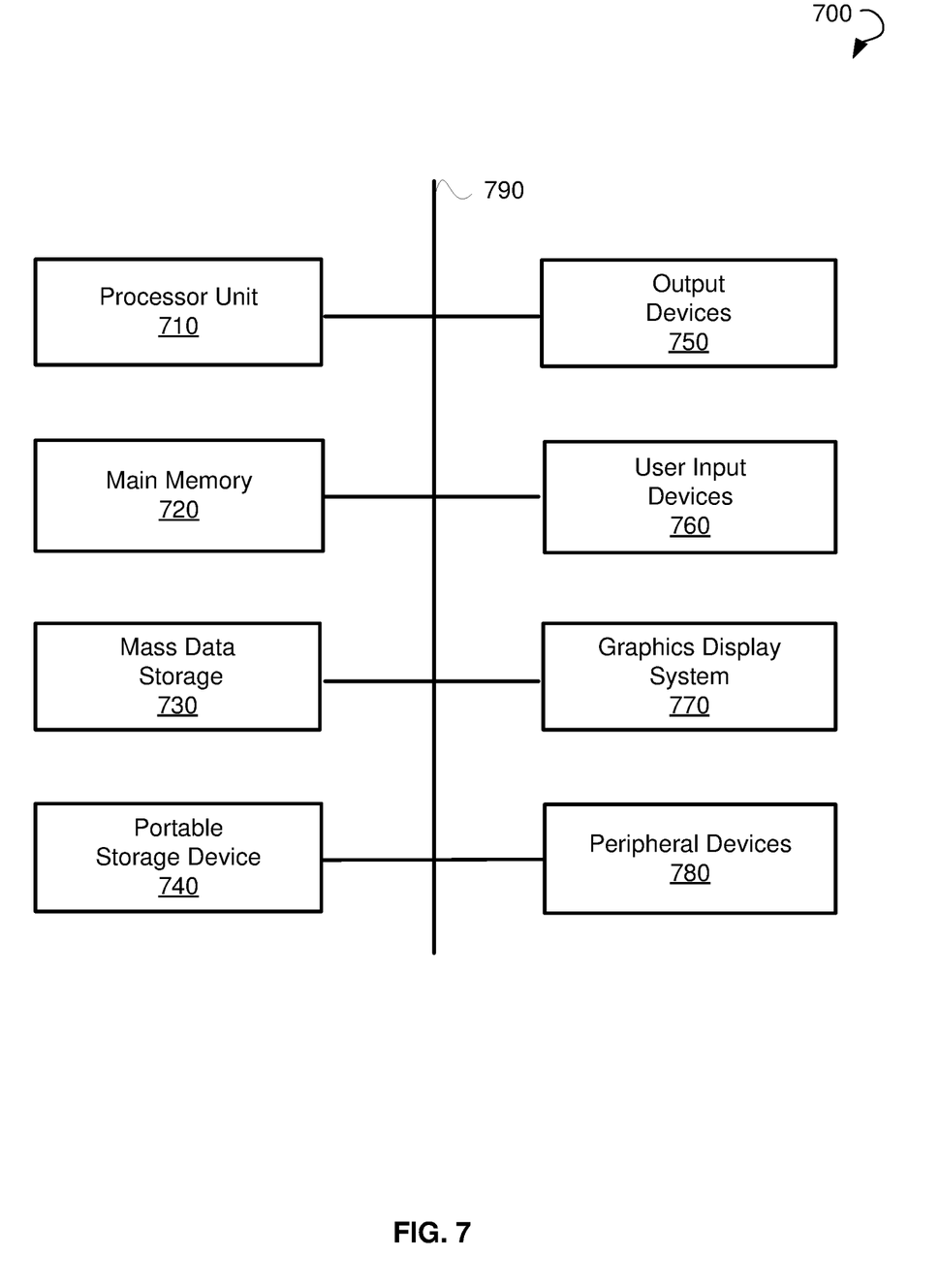
FIG. 7 shows a diagrammatic representation of a computing device for a machine, within which a set of instructions for causing the machine to perform any one or more of the methodologies discussed herein can be executed.

FIG. 7 illustrates a computer system 700 that may be used to implement embodiments of the present disclosure, according to an example embodiment. The computer system 700 may serve as a computing device for a machine, within which a set of instructions for causing the machine to perform any one or more of the methodologies discussed herein can be executed. The computer system 700 can be implemented in the contexts of the likes of computing systems, networks, servers, or combinations thereof. The computer system 700 includes one or more processor units 710 and main memory 720. Main memory 720 stores, in part, instructions and data for execution by processor units 710. Main memory 720 stores the executable code when in operation. The computer system 700 further includes a mass data storage 730, a portable storage device 740, output devices 750, user input devices 760, a graphics display system 770, and peripheral devices 780. The methods may be implemented in software that is cloud-based.

The components shown in FIG. 7 are depicted as being connected via a single bus 790. The components may be connected through one or more data transport means. Processor units 710 and main memory 720 are connected via a local microprocessor bus, and mass data storage 730, peripheral devices 780, the portable storage device 740, and graphics display system 770 are connected via one or more I/O buses.

Mass data storage 730, which can be implemented with a magnetic disk drive, solid state drive, or an optical disk drive, is a non-volatile storage device for storing data and instructions for use by processor units 710. Mass data storage 730 stores the system software for implementing embodiments of the present disclosure for purposes of loading that software into main memory 720.

The portable storage device 740 operates in conjunction with a portable non-volatile storage medium, such as a floppy disk, a CD, a DVD, or a USB storage device, to input and output data and code to and from the computer system 700. The system software for implementing embodiments of the present disclosure is stored on such a portable medium and input to the computer system 700 via the portable storage device 740.

User input devices 760 provide a portion of a user interface. User input devices 760 include one or more microphones, an alphanumeric keypad, such as a keyboard, for inputting alphanumeric and other information, or a pointing device, such as a mouse, a trackball, stylus, or cursor direction keys. User input devices 760 can also include a touchscreen. Additionally, the computer system 700 includes output devices 750. Suitable output devices include speakers, printers, network interfaces, and monitors.

Graphics display system 770 includes a liquid crystal display or other suitable display device. Graphics display system 770 receives textual and graphical information and processes the information for output to the display device. Peripheral devices 780 may include any type of computer support device to add additional functionality to the computer system.

The components provided in the computer system 700 of FIG. 7 are those typically found in computer systems that may be suitable for use with embodiments of the present disclosure and are intended to represent a broad category of such computer components that are well known in the art. Thus, the computer system 700 can be a PC, handheld computing system, telephone, mobile computing system, workstation, tablet, phablet, mobile phone, server, minicomputer, mainframe computer, or any other computing system. The computer may also include different bus configurations, networked platforms, multi-processor platforms, and the like. Various operating systems may be used including UNIX, LINUX, WINDOWS, MAC OS, PALM OS, ANDROID, IOS, QNX, and other suitable operating systems.

It is noteworthy that any hardware platform suitable for performing the processing described herein is suitable for use with the embodiments provided herein. Computer-readable storage media refer to any medium or media that participate in providing instructions to a central processing unit, a processor, a microcontroller, or the like. Such media may take forms including, but not limited to, non-volatile and volatile media such as optical or magnetic disks and dynamic memory, respectively. Common forms of computer-readable storage media include a floppy disk, a flexible disk, a hard disk, magnetic tape, any other magnetic storage medium, a Compact Disk Read Only Memory disk, DVD, Blu-ray disc, any other optical storage medium, RAM, Programmable Read-Only Memory, Erasable Programmable Read-Only Memory, Electronically Erasable Programmable Read-Only Memory, flash memory, and/or any other memory chip, module, or cartridge.

In some embodiments, the computer system 700 may be implemented as a cloud-based computing environment, such as a virtual machine operating within a computing cloud. In other embodiments, the computer system 700 may itself include a cloud-based computing environment, where the functionalities of the computer system 700 are executed in a distributed fashion. Thus, the computer system 700, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud may be formed, for example, by a network of web servers that comprise a plurality of computing devices, such as the computer system 700, with each server (or at least a plurality thereof) providing processor and/or storage resources. These servers may manage workloads provided by multiple users (e.g., cloud resource customers or other users). Typically, each user places workload demands upon the cloud that vary in real-time, sometimes dramatically. The nature and extent of these variations typically depends on the type of business associated with the user.

Thus, methods and systems for selecting an SLB for processing requests associated with a client have been described. Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense.

What is claimed is:

1. A system for selecting a server load balancer (SLB) for processing requests associated with a client, the system comprising:
    a first Global Server Load Balancing (GSLB) controller associated with a plurality of distributed GSLB controllers, the first GSLB controller being configured to:
    receive, from a client Domain Name System (DNS) server associated with the client, a DNS request, the DNS request including a request to establish a session between the client and one of a plurality of application servers, each of the plurality of distributed GSLB controllers being in communication with one of pluralities of server load balancers (SLB);
    based on the DNS request, determine a geolocation associated with the client;
    receive a time delay record from each of a first plurality of SLBs associated with the first GSLB controller, the time delay record including a round trip time (RTT) between the client and each of the first plurality of SLBs and a geolocation associated with the each of the first plurality of SLBs, the each of the first plurality of SLBs being associated with one or more of the plurality of application servers;
    send a first instruction to a second GSLB controller selected from the plurality of distributed GSLB controllers to measure a time delay record associated with each SLB of a second plurality of SLBs associated with the second GSLB controller;
    in response to the first instruction, receive, from the second GSLB controller, the time delay record associated with each of the second plurality of SLBs associated with the second GSLB controller, the time delay record including a RTT between the client and each of the second plurality of SLBs and a geolocation associated with the each of the second plurality of SLBs, the each of the second plurality of SLBs being associated with one or more of the plurality of application servers;
    based on the time delay record received from the each of the first plurality of SLBs and the each of the second plurality of SLBs, match the geolocation associated with the client and the geolocation associated with the each of the first plurality of SLBs and the each of the second plurality of SLBs;
    based on the matching, select one or more SLBs having the geolocation that matches the geolocation associated with the client;
    select, from the one or more SLBs, based on the time delay record received from the each of the first plurality of SLBs and the each of the second plurality of SLBs, an SLB having a lowest RTT;
    and based on the selection of the SLB having the lowest RTT, send a DNS response to the client DNS server, the DNS response including network data of the SLB having the lowest RTT;
    the second GSLB controller associated with the plurality of distributed GSLB controllers, the second GSLB controller being configured to:
    receive, from the first GSLB controller, a second instruction to provide the time delay record associated with each of the second plurality of SLBs associated with the second GSLB controller;
    and in response to the second instruction, provide the time delay record associated with each of the second plurality of SLBs to the first GSLB controller;
    and a database for storing the time delay record associated with the each of the first plurality of SLBs and the time delay record associated with the each of the second plurality of SLBs.

2. The system of claim 1, wherein the first GSLB controller, the second GSLB controller, and each of the plurality of GSLB controllers are further configured to maintain a time distance table in the database for storing the time delay record.

3. The system of claim 2, wherein the first GSLB controller is further configured to:
    store the time delay record received from the each of the first plurality of SLBs associated with the first GSLB controller to the time distance table; and
    store the time delay record from the each of the second plurality of SLBs associated with the second GSLB controller to the time distance table.

4. The system of claim 2, wherein the first GSLB controller is further configured to:
    periodically receive an updated time delay record associated with the each of the first plurality of SLBs and the each of the second plurality of SLBs; and
    store the updated time delay record to the time distance table.

5. The system of claim 2, wherein the first GSLB controller is further configured to:
    based on the DNS request, search, in the database, for the geolocation associated with one or more of the first plurality of SLBs and the second plurality of SLBs that matches the geolocation associated with the client.

6. The system of claim 1, wherein the RTT between the client and the each of the first plurality of SLBs includes a sum of a first RTT between the client and the each of the first plurality of SLBs and a second RTT between the each of the first plurality of SLBs and at least one application server of the plurality of application servers; and wherein the RTT between the client and the each of the second plurality of SLBs includes a sum of a first RTT between the client and the each of the second plurality of SLBs and a second RTT between the each of the second plurality of SLBs and at least one further application server of the plurality of application servers.

7. The system of claim 6, wherein the first GSLB controller is further configured to:
determine, based on a domain name included in the DNS request, a type of the session requested to be established by the client;
receive, from each of the first plurality of SLBs and the second plurality of SLBs, a processing time associated with each of the at least one application server and the at least one further application server, the processing time including time needed for each of the at least one application server and the at least one further application server for processing the session based on the type of the session; and
sum the processing time and the RTT for each of the first plurality of SLBs and the second plurality of SLBs to obtain a cumulative RTT for each of the first plurality of SLBs and the second plurality of SLBs.

8. The system of claim 7, wherein the domain name includes a string selected from a group comprising: a Hypertext Transfer Protocol, a File Transfer Protocol, a Session Initiation Protocol, a voice over Internet protocol, a web, a file, a mail, a Post Office Protocol, an exchange, and an email.

9. The system of claim 1, wherein the first GSLB controller and the second GSLB controller are configured to exchange requests.

10. The system of claim 1, wherein the determining of the geolocation associated with the client is based on an Internet Protocol (IP) address associated with the client, the IP address being present in the DNS request.

11. A method for selecting a server load balancer (SLB) for processing requests associated with a client, the method comprising:
receiving, by a first Global Server Load Balancing (GSLB) controller associated with a plurality of distributed GSLB controllers, from a client Domain Name System (DNS) server associated with the client, a DNS request, the DNS request including a request to establish a session between the client and one of a plurality of application servers, each of the plurality of distributed GSLB controllers being in communication with one of pluralities of server load balancers (SLB);
determining, by the first GSLB controller, based on the DNS request, a geolocation associated with the client;
receiving, by the first GSLB controller, a time delay record from each of a first plurality of SLBs associated with the first GSLB controller, the time delay record including a round trip time (RTT) between the client and the each of the first plurality of SLBs and a geolocation associated with the each of the first plurality of SLBs, the each of the first plurality of SLBs being associated with one or more of the plurality of application servers;
instructing, by the first GSLB controller, a second GSLB controller selected from the plurality of distributed GSLB controllers to measure a time delay record associated with each SLB of a second plurality of SLBs associated with the second GSLB controller;
in response to the instruction, receiving, by the first GSLB controller, from the second GSLB controller, the time delay record associated with each of the second plurality of SLBs associated with the second GSLB controller, the time delay record including a RTT between the client and the each of the second plurality of SLBs and a geolocation associated with the each of the second plurality of SLBs, the each of the second plurality of SLBs being associated with one or more of the plurality of application servers;
based on the time delay record received from the each of the first plurality of SLBs and the each of the second plurality of SLBs, matching, by the first GSLB controller, the geolocation associated with the client and the geolocation associated with the each of the first plurality of SLBs and the each of the second plurality of SLBs;
based on the matching, selecting, by the first GSLB controller, one or more SLBs having the geolocation that matches the geolocation associated with the client;
selecting, by the first GSLB controller, from the one or more SLBs, based on the time delay record received from the each of the first plurality of SLBs and the each of the second plurality of SLBs, an SLB having a lowest RTT; and
based on the selection of the SLB having the lowest RTT, sending, by the first GSLB controller, a DNS response to the client DNS server, the DNS response including network data of the SLB having the lowest RTT.

12. The method of claim 11, further comprising:
maintaining, by the first GSLB controller, the second GSLB controller, and each of the plurality of GSLB controllers, a time distance table in a database for storing the time delay record.

13. The method of claim 12, further comprising:
storing, by the first GSLB controller, the time delay record received from the each of the first plurality of SLBs associated with the first GSLB controller to the time distance table; and
storing, by the first GSLB controller, the time delay record from the each of the second plurality of SLBs associated with the second GSLB controller to the time distance table.

14. The method of claim 12, further comprising:
periodically receiving, by the first GSLB controller, an updated time delay record associated with the each of the first plurality of SLBs and the each of the second plurality of SLBs; and
storing, by the first GSLB controller, the updated time delay record to the time distance table.

15. The method of claim 12, further comprising:
based on the DNS request, searching, by the first GSLB controller, in the database, for the geolocation associated with one or more of the first plurality of SLBs and the second plurality of SLBs that matches the geolocation associated with the client.

16. The method of claim 11, wherein the RTT between the client and the each of the first plurality of SLBs includes a sum of a first RTT between the client and the each of the first plurality of SLBs and a second RTT between the each of the first plurality of SLBs and at least one application server of the plurality of application servers; and
wherein the RTT between the client and the each of the second plurality of SLBs includes a sum of a first RTT between the client and the each of the second plurality of SLBs and a second RTT between the each of the second plurality of SLBs and at least one further application server of the plurality of application servers.

17. The method of claim 16, further comprising:
determining, by the first GSLB controller, based on a domain name included in the DNS request, a type of the session requested to be established by the client;
receiving, by the first GSLB controller, from each of the first plurality of SLBs and the second plurality of SLBs, a processing time associated with each of the at least one application server and the at least one further application server, the processing time including time needed for each of the at least one application server and the at least one further application server for processing the session based on the type of the session; and
summing, by the first GSLB controller, the processing time and the RTT for each of the first plurality of SLBs and the second plurality of SLBs to obtain a cumulative RTT for each of the first plurality of SLBs and the second plurality of SLBs.

18. The method of claim 17, wherein the domain name includes a string selected from a group comprising: a Hypertext Transfer Protocol, a File Transfer Protocol, a Session Initiation Protocol, a voice over Internet protocol, a web, a file, a mail, a Post Office Protocol, an exchange, and an email.

19. The method of claim 11, wherein the determining of the geolocation associated with the client is based on an Internet Protocol (IP) address associated with the client, the IP address being present in the DNS request.

20. A system for selecting a server load balancer (SLB) for processing requests associated with a client, the system comprising:
a first Global Server Load Balancing (GSLB) controller associated with a plurality of distributed GSLB controllers, the first GSLB controller being configured to:
receive, from a client Domain Name System (DNS) server associated with the client, a DNS request, the DNS request including a request to establish a session between the client and one of a plurality of application servers, each of the plurality of distributed GSLB controllers being in communication with one of pluralities of server load balancers (SLB);
based on the DNS request, determine a geolocation associated with the client;
receive a time delay record from each of a first plurality of SLBs associated with the first GSLB controller, the time delay record including a round trip time (RTT) between the client and each of the first plurality of SLBs and a geolocation associated with the each of the first plurality of SLBs, the each of the first plurality of SLBs being associated with one or more of the plurality of application servers;
send a first instruction to a second GSLB controller selected from the plurality of distributed GSLB controllers to measure a time delay record associated with each SLB of a second plurality of SLBs associated with the second GSLB controller;
in response to the first instruction, receive, from the second GSLB controller, the time delay record associated with each of the second plurality of SLBs associated with the second GSLB controller, the time delay record including a RTT between the client and each of the second plurality of SLBs and a geolocation associated with the each of the second plurality of SLBs, the each of the second plurality of SLBs being associated with one or more of the plurality of application servers;
based on the time delay record received from the each of the first plurality of SLBs and the each of the second plurality of SLBs, match the geolocation associated with the client and the geolocation associated with the each of the first plurality of SLBs and the each of the second plurality of SLBs;
based on the matching, select one or more SLBs having the geolocation that matches the geolocation associated with the client select, from the one or more SLBs, based on the time delay record received from the each of the first plurality of SLBs and the each of the second plurality of SLBs, an SLB having a lowest RTT;
based on the selection of the SLB having the lowest RTT, send a DNS response to the client DNS server, the DNS response including network data of the SLB having the lowest RTT;
maintain a time distance table in a database for storing the time delay record; store the time delay record received from the each of the first plurality of SLBs associated with the first GSLB controller to the time distance table;
store the time delay record from the each of the second plurality of SLBs associated with the second GSLB controller to the time distance table;
periodically receive an updated time delay record associated with the each of the first plurality of SLBs and the each of the second plurality of SLBs; and store the updated time delay record to the time distance table;
the second GSLB controller associated with the plurality of distributed GSLB controllers, the second GSLB controller being configured to:
receive, from the first GSLB controller, a second instruction to provide the time delay record associated with each of the second plurality of SLBs associated with the second GSLB controller;
and in response to the second instruction, provide the time delay record associated with each of the second plurality of SLBs to the first GSLB controller;
and the database for storing the time delay record associated with the each of the first plurality of SLBs and the time delay record associated with the each of the second plurality of SLBs.

* * * * *